US006947237B2

(12) United States Patent
Christie, Jr.

(10) Patent No.: US 6,947,237 B2
(45) Date of Patent: Sep. 20, 2005

(54) WORM MAGNETIC TAPE WITH CARTRIDGE MEMORY SYSTEM AND METHOD

(75) Inventor: Leslie G. Christie, Jr., Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 346 days.

(21) Appl. No.: 09/974,602

(22) Filed: Oct. 9, 2001

(65) Prior Publication Data

US 2003/0067701 A1 Apr. 10, 2003

(51) Int. Cl.[7] ................................................ G11B 19/04
(52) U.S. Cl. .............................. 360/60; 360/48; 360/69
(58) Field of Search .............................. 360/60, 31, 53, 360/69, 71, 74.4, 74.5, 132; 369/53.1; 242/347

(56) References Cited

U.S. PATENT DOCUMENTS

| | | | | |
|---|---|---|---|---|
| 4,746,796 A | * | 5/1988 | Heigl | 250/324 |
| 4,947,367 A | | 8/1990 | Chang et al. | |
| 5,199,593 A | * | 4/1993 | Kita | 220/613 |
| 5,233,576 A | | 8/1993 | Curtis et al. | 369/13 |
| 5,535,188 A | | 7/1996 | Dang et al. | |
| 5,612,827 A | * | 3/1997 | Morita | 360/25 |
| 5,978,546 A | | 11/1999 | Abe et al. | |
| 6,339,810 B1 | | 1/2002 | Basham et al. | |
| 6,611,394 B1 | * | 8/2003 | Kato et al. | 360/69 |
| 6,674,596 B1 | | 1/2004 | Takayama | |

FOREIGN PATENT DOCUMENTS

| | | | | |
|---|---|---|---|---|
| EP | 0 594 450 | | 4/1994 | |
| EP | 0 621 593 | | 10/1994 | |
| GB | 2 305 535 | | 4/1997 | |
| JP | 6 302 049 | | 10/1994 | |
| JP | 2000268443 | | 9/2000 | |
| JP | 2000268443 A | * | 9/2000 | G11B/15/05 |
| JP | 2000295507 A | * | 10/2000 | H04N/5/225 |
| JP | 2001135000 | | 5/2001 | |

OTHER PUBLICATIONS

"Storage by Sony", Press Release dated Apr. 18, 2001 [online] [Retrieved on Oct. 1, 2003], Retrieved from: (http://www.storagebysony.com/news/pressengine.asp?id=27).

European Search Report issued for EP 02 25 6958, dated Oct. 10, 2004.

* cited by examiner

*Primary Examiner*—David Hudspeth
*Assistant Examiner*—Daniel L. Negrón

(57) ABSTRACT

A write once read many magnetic tape system has a tape cartridge housing a length of magnetic tape adapted to record and store electronic data, and an electronic memory device. A tape drive receives the tape and reads the memory device. The drive is operable only in a write once read many mode in response to information read from the memory device.

40 Claims, 1 Drawing Sheet

WORM MAGNETIC TAPE WITH CARTRIDGE MEMORY SYSTEM AND METHOD

TECHNICAL FIELD

The present invention generally relates to magnetic tapes and tape drives for archiving and backup, and more specifically to write once read many (WORM) magnetic tape with cartridge memory (CM) system and method.

BACKGROUND

The use of half-inch magnetic tape cartridge technology for back-up and archive purposes is well known in the art. Such tapes and drives include those formats known as digital linear tape (DLT®) and linear tape open (LTO™). Both types of tape are popular for back-up, archive and library uses. Both of these formats are read/write capable. The magnetic tape drives are magneto-based. A magneto head moves across a tape as it passes over the head, serpentining down the tape to fill the entire tape with data. A significant difference between the DLT® tapes and the LTO™ tapes is that the LTO™ tapes have a memory chip in the cartridge that allows storage and retrieval of information about the tape and its use. Prior art magneto optic (MO) drives and libraries are also popular for archiving. Magneto optic drives are a read/write device. MO drives allow random access similar to a CD-ROM disk.

The use of write once read many (WORM) storage is desirable for many records, especially for archiving, particularly for archiving financial or confidential information. With the rise of the Internet, many transactions are carried out in day-to-day commerce with no paper or permanent record. This creates problems when customer or legal issues arise. Therefore, a need exists to permanently archive data thereby creating a permanent record. However, an archive medium must have a very large capacity and through-put to handle these transactions.

Data preservation problems have been addressed by the prior art by providing temporary write protection. Floppy disks for example, have write protect notches or lock slides which, can be employed to prevent writing on the media. Therefore, a device can write on the media while the notch is uncovered or a slide is in an unlocked position, and then the notch can be covered or lock slide engaged to make the media "read-only". Magnetic tape has addressed this problem in a similar manner with a write ring, or in the case of tape cartridges with a record slide switch. These methods all suffer from the same drawback, that is, the mechanism is very easily reversed to make the media writeable once again. Once the media is writeable, data stored thereon can be easily lost as the system overwrites new data onto the previously stored data. Similarly, in most computer operating systems, a file can be marked as read-only after it has been initially written. Again, however, the read-only status is very temporary and can easily be reversed with another operating system command. Because the mechanism is easily reversed in all these cases, there is no audit trail or assurance of data integrity.

A problem in converting traditionally rewriteable media to write-once media is that drives that were manufactured prior to the design of the new WORM media will not understand that the media is WORM and may write on the media even though it has been designated as read-only. Because the previously-manufactured drive is unaware of the mechanism by which the media is converted to read-only, it might ignore such a mechanism and write on or erase the media.

WORM instructions may be embedded in an MO disk. Such that when a particular portion of the disk is read at boot-up, the disk is recognized as a WORM disk and the drive can only write once to any given point on the disk. Such a system and method are disclosed in Curtis, U.S. Pat. No. 5,233,576, which is hereby incorporated herein by reference in its entirety. MO archive media and drives are considerably more expensive per megabyte than tape. Tape is very inexpensive per megabyte, and a tape cartridge can hold more data than MO media.

As pointed out above, the use of memory in a tape cartridge, generally referred to as cartridge memory (CM), is known in the art. Existing cartridges and drives store information in the cartridge memory such as how many times a tape has been loaded, a cassette serial number, what was last written on the tape, what block was last written to on the tape and/or the tape error rate. This information facilitates setting up the tape when it is inserted back into a drive. Thus the drive recognizes the tape format and adjusts itself to read or write the next block. Information in the memory about error rate and/or number of loads can help diagnose failing tapes. Such cartridge memory, also known as memory in cartridge (MIC), was first used by Sony Corporation and is employed in the aforementioned LTO™ format. The use of cartridge memory is also planned in Quantum Corporation's new Super DLT® tapes.

Each time a tape cartridge with CM is inserted into a drive the CM is read during initialization. If there is no cartridge memory reader in the drive, the tape will not function at all. During the drive initialization sequence, the drive reads the memory, diagnoses the tape, recognizes the tape format and where writing should begin.

SUMMARY OF THE INVENTION

A write once read many magnetic tape system has a tape cartridge housing a length of magnetic tape adapted to record and store electronic data, and an electronic memory device. A tape drive receives the tape and reads the memory device. The drive is operable only in a write once read many mode in response to information read from the memory device.

DETAILED DESCRIPTION

The present invention provides a system and method for employing the cartridge memory (CM) of a magnetic data tape cartridge to set up a tape drive so that the drive will recognize the tape cartridge as a write once read many (WORM) cartridge, and configure the tape drive to operate only in a WORM mode. This allows a point on the inserted tape to be written to only once and prevents erasure of data on the tape by the drive. WORM tape is low cost, high capacity, and has a high transfer rate. A WORM tape of the present invention produces a true archive, using a convertible archive device. In other words, one cannot later change data archived on the present WORM tape with cartridge memory. However, the tape drive is not solely dedicated to WORM functions. Preferably, the drive is only in WORM mode when a WORM tape is in the drive. At other times the tape drive preferably operates as a normal read/write tape drive.

It is desirable to provide a WORM magnetic tape to take advantage of the low cost, high capacity and high throughput rate of magnetic tape. It is also desirable to provide a tape media that will only allow a tape drive to operate in a WORM mode as long as that tape is in the drive. Another need in the art is satisfied by providing an apparatus and method that prevents previously manufactured read/write tape drives from using the WORM tape media as rewriteable.

As noted above, an LTO™ tape is one type of data tape with CM. An LTO™ cartridge memory (LTO-CM) transponder is built into the shell of an LTO™ cartridge. A contactless interface enables a drive controller to communicate with the LTO-CM transponder. The LTO-CM transponder contains an electronic erasable-programable read-only memory (EEPROM) device. The LTO-CM has writeable units of either a word or a block. There are a number of distinct data fields within the LTO-CM. The LTO-CM content is organized into logical regions called pages.

Figure 1:
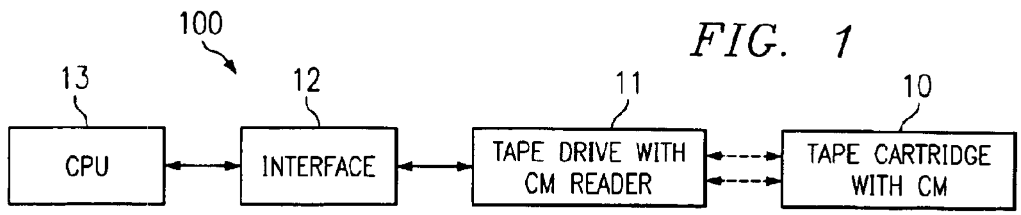
FIG. 1 is a diagrammatic representation of a computer system employing an example of a WORM magnetic tape with cartridge memory according to the teachings of the present invention.

Turning to FIG. 1, there is illustrated computer system 100 employing an example of a WORM tape cartridge 10 according to the teachings of the present invention. Tape 10 is received by tape drive 11. The tape drive is connected via interface 12 to a computer or similar general processing device, indicated in FIG. 1 as CPU 13. The tape drive is capable of reading an EEPROM or similar memory device disposed within tape cartridge 10. It will be appreciated that before cartridge memory was employed in tape cartridges, it was not possible to encode any special code on a tape that could not be changed. As noted earlier, there are several types of existing cartridges that have cartridge memory, a portion of which is read only memory (ROM). A portion of a chip in the cartridge can be read at tape loading and initialization, before the drive is engaged. The cartridge memory contains information such as calibration information, tape format and last read/write point of the tape. Preferably, a WORM tape according to the present invention takes advantage of a specific field in the cartridge memory that has a cartridge type indication, defined on a cartridge manufacturer's information memory page. The present invention calls for this cartridge type information to be preferably designated as WORM. In accordance with the present invention, firmware of drive 11 sets the drive up in a WORM mode, preferably in response to the designation of WORM as the cartridge type identification located on the manufacturer's identification page of the EEPROM. Thus set up, a drive with the proper firmware in a WORM configuration or mode will only perform WORM-type functions as long as the WORM tape is in the drive. Data may be transferred between the computer and drive via interface 12, with drive 11 selectively reading data from tape 10 and writing data to tape 10. However, in WORM mode the drive is prohibited from erasing or overwriting data on tape 10 or reformatting tape 10. In WORM mode the drive will not respond to any kind of front panel or SCSI commands that are not WORM commands. The drive will only perform writes to blank portions of the tape, or reads of the tape.

Figure 2:
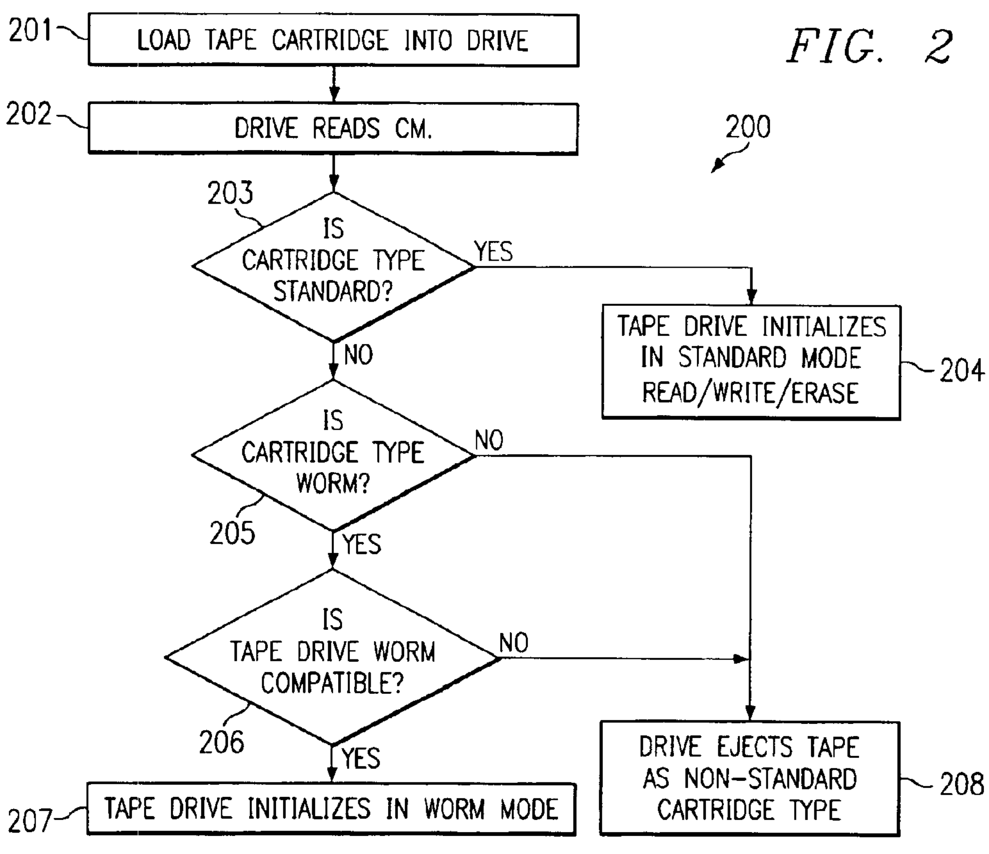
FIG. 2 is a flow chart of operation of the example WORM tape of FIG. 1.

Exemplary process 200 employed by the WORM magnetic tape with CM of FIG. 1 is charted in greater detail in FIG. 2. A tape cartridge with CM is loaded into a tape drive capable of reading CM at box 201. The drive reads the CM at box 202. The portion of the CM of concern to the present invention is preferably the cartridge type information that is preferably located on a cartridge manufacturer's information memory page. At 203 a determination is made as to whether the tape cartridge is a standard read/write tape. If the cartridge is a standard read/write tape, then the drive initializes for normal operation at box 204, allowing read, write and erase functions, including overwriting or erasing data existing on or written to the tape. However, if the tape is not a standard type, a determination is made at 205 as to whether the tape is a WORM tape. If the tape is a WORM tape and the drive is WORM tape compatible, as determined at 206, then the drive initializes in WORM mode at box 207. In WORM mode, the tape is effectively write protected. The tape drive allows the tape to be read, only writes to blank portions of the tape and does not erase, overwrite or reformat the tape.

Preferably, the WORM tape standards are incorporated into the cartridge memory reader firmware of the drive in accordance with the present invention. Thus, if a WORM tape is inserted into a drive, such as a conventional LTO™ tape drive, the drive will preferably not recognize the WORM tape standard as a supported standard. If the cartridge type does not match a known type such as standard or WORM, at 203 or 205 respectively, then the drive preferably ejects the tape at box 208 as a nonstandard cartridge type. Likewise, if the drive is incapable of recognizing the WORM cartridge type at 206, then it will eject the tape at 208. Alternatively, the drive may only reject the tape by indicating that the tape is unusable or is an unrecognizable format, refusing to use the tape. This automatic ejection or rejection of the tape, in combination with the inability of a tape drive without a CM reader to use a tape cartridge with CM, ensures that tape drives that cannot support WORM cartridges will not accidentally corrupt data on a WORM tape.

Preferably, each time new data is written to the WORM tape, a new end-of-file marker is written in another ROM portion of the CM. If a portion of the tape is somehow erased or damaged, the tape data will not agree with the cartridge memory and would thereby reveal potential tampering.

Furthermore, to avoid a drive from being modified to write over a WORM tape, an alternative embodiment calls for the write density of the tape to be altered so the tape is slightly out of format with non-WORM capable tape drives. Preferably, the only function such an altered drive might be able to carry out would be to erase the whole tape, but the data could not be rewritten or altered.

Figure 3:
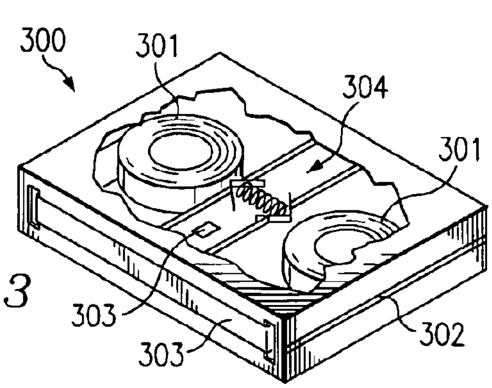
FIG. 3 is a partially fragmented perspective view of a tape cartridge illustrating a preferred embodiment of the WORM tape with alternative elements according to the teachings of the present invention.

In FIG. 3 a preferred embodiment 300 of the WORM tape with CM, according to the teachings of the present invention, is illustrated with alternative elements. Preferably, cartridge 300 cannot be opened without damage to tape 301. The cases of tape cartridges with CM are typically held together by screws. So cartridges can be unscrewed, and the memory chip removed or replaced. Preferably, seams 302 of WORM tape cartridge 300 are welded, glued or snapped together in such a way that if cartridge 300 is taken apart, tape 301 is rendered unusable or destroyed so that CM 303 cannot be replaced and the data on tape 301 overwritten. Alternatively, spring-loaded device 304 could be employed to destroy or irreparably damage tape 301, rendering it unusable if cartridge 300 were opened.

What is claimed is:

1. A write once read many magnetic tape system, said system comprising:

a tape cartridge comprising a length of magnetic tape adapted to record and store electronic data using a write density differing from non-write once read many standard type tapes, and an electronic memory device; and a tape drive adapted to read and write said tape, said tape drive receives said tape cartridge and reads said memory device, wherein said drive is operable only in a write once read many mode in response to information read from said memory device.

2. The system of claim 1 wherein said drive ejects said cartridge in response to said drive being unable to recognize said information from said memory device.

3. The system of claim 1 wherein said tape cartridge only functions in a tape drive capable of recognizing said information read from said memory device to place said drive in said write once read many mode.

4. The system of claim 1 wherein said information read from said memory device is a tape cartridge type.

5. The system of claim 4 wherein said tape cartridge type is contained on a manufacturer's information data page of said memory device.

6. The system of claim 1 wherein said electronic memory device, at least in part, comprises nonvolatile electronic memory.

7. The system of claim 1 wherein at least a portion of said memory device is read only.

8. The system of claim 1 wherein said memory device is an electronically erasable programmable read only memory chip.

9. A write once read many magnetic tape system, said system comprising:

a tape cartridge comprising a length of magnetic tape adapted to record and store electronic data using a write density differing from standard type tape, and an electronic memory device;

a tape drive that receives said tape cartridge and reads said memory device, wherein said drive is operable only in a write once read many mode in response to information read from said memory device; and a tape destruction mechanism, operable in response to opening of said tape cartridge, to render said tape unusable.

10. A write once read many magnetic tape with cartridge memory, said tape comprising:

a cartridge;

a length of magnetic tape medium is capable of storing electronic data using a write density differing from standard type tape media, said magnetic tape medium being operably housed in said cartridge; and a memory device is disposed within said cartridge, said memory device is capable of being read by selected tape drives adapted to read from and write to said tape medium, said memory device identifying said tape as a write once read many tape type.

11. The tape of claim 10 wherein said tape cartridge is ejected in response to a drive failing to recognize said write once read many tape type.

12. The tape of claim 10 wherein said tape only functions in a tape drive capable of placing said drive in a write once read many mode in response to said write once read many tape type identification.

13. The tape of claim 10 wherein said memory device, at least in part, comprises nonvolatile memory.

14. The tape of claim 10 wherein said write once read many tape type is contained on a manufacturer's information data page of said memory device.

15. The tape of claim 10 wherein at least a portion of said memory device is read only.

16. The tape of claim 10 wherein said memory device is an electronically erasable programmable read only memory chip.

17. A write once read many magnetic tape with cartridge memory, said tape comprising:

a cartridge;

a length of magnetic tape medium is capable of storing electronic data, using a write density differing from standard type tapes, said magnetic tape medium being operably housed in said cartridge;

a memory device is disposed within said cartridge, said memory device is capable of being read by selected tape drives, said memory device identifying said tape as a write once read many tape type; and at least one mechanism operable in response to opening said tape cartridge to render said tape unusable.

18. The tape of claim 17 wherein said at least one mechanism comprises welded seams joining said cartridge.

19. The tape of claim 17 wherein said at least one mechanism comprises glued seams joining said cartridge.

20. The tape of claim 17 wherein said at least one mechanism comprises snap fitted joining of said cartridge.

21. The tape of claim 17 wherein said at least one mechanism comprises a spring-loaded tape destruction mechanism.

22. A method to convert a magnetic tape drive to a write once read many tape drive, said method comprising the steps of:

providing a magnetic tape cartridge comprising a memory device, said memory device identifying said tape cartridge as a write once read many type tape cartridge, said magnetic tape cartridge further comprising a length of magnetic tape medium capable of storing electronic data using a write density differing from standard type tape media;

receiving said tape cartridge in said magnetic tape drive;

reading, with said magnetic tape drive, said write once read many tape type from said memory device; and initializing said tape drive, in response to said read tape type, in a write once read many mode.

23. The method of claim 22 comprising the step of:

write protecting data written on a tape in said tape cartridge.

24. The method of claim 22 wherein said initializing step further comprises the step of:

limiting functions that said tape drive may perform, while said tape is in said drive, to tape transport, tape reading and writing to blank portions of a tape in said tape cartridge.

25. The method of claim 22 further comprising the step of:

enabling said tape cartridge to only function in a tape drive capable of recognizing said tape cartridge as a write once read many type tape cartridge.

26. The method of claim 22 further comprising the step of:

ejecting said tape cartridge from said tape drive in response to said tape drive being unable to read said write once read many tape type.

27. The method of claim 22 wherein said tape type is contained on a manufacturer's information data page of said memory device.

28. The method of claim 22 wherein said memory device, at least in part, comprises nonvolatile memory.

29. The method of claim 22 wherein at least a portion of said memory device is read only.

30. The method of claim 22 wherein said memory device is an electronically erasable programmable read only memory chip.

31. A write once read many magnetic tape drive comprising:

means for receiving a tape cartridge having a length of magnetic tape adapted to record and store electronic data using a write density differing from standard tapes of a same format, and having an electronic memory device; and means for reading data from said tape and writing data to said tape using said write density differing from standard tapes of a same format;

means for reading said memory device; and means for initializing said drive in a write once read many mode in response to information read from said memory device.

32. The drive of claim 31 further comprising means for initializing said drive in a standard read/write mode.

33. The drive of claim 31 further comprising means for ejecting said cartridge in response to said drive being unable to recognize said information from said memory device.

34. The drive of claim 31 wherein said tape cartridge only functions in a tape drive capable of recognizing said information read from said memory device to place said drive in said write once read many mode.

35. The drive in claim 31 wherein said tape cartridge only functions in a tape drive capable of reading data from, and writing data to, a tape using said write density differing from standard tapes of a same format.

36. A write once read many magnetic tape cartridge memory device comprising:

means for designating, to a tape drive receiving a tape cartridge housing said device, between a write once and read many type for said tape cartridge and a standard type for said tape cartridge; and means for identifying a write density of a tape medium operatively housed in said tape cartridge differing from standard tape media of a same format.

37. The system of claim 36 wherein said type is contained on a manufacturer's information data page of said memory device.

38. The system of claim 36 wherein said memory device, at least in part, comprises nonvolatile electronic memory.

39. The system of claim 36 wherein at least a portion of said memory device is read only.

40. The system of claim 36 wherein said memory device is an electronically erasable programmable read only memory chip.

* * * * *

UNITED STATES PATENT AND TRADEMARK OFFICE

CERTIFICATE OF CORRECTION

PATENT NO. : 6,947,237 B2
APPLICATION NO. : 09/974602
DATED : September 20, 2005
INVENTOR(S) : Leslie G. Christie, Jr.

It is certified that error appears in the above-identified patent and that said Letters Patent is hereby corrected as shown below:

In column 5, line 38, in Claim 9, after “from” insert -- non-write once read many --.

In column 5, line 52, in Claim 10, insert -- non-write once read many -- before “standard”.

In column 6, line 14, in Claim 17, insert -- non-write once read many -- before “standard”.

In column 6, line 41, in Claim 22, insert -- non-write once read many -- before “standard”.

In column 7, line 12, in Claim 31, after “from” insert -- non-write once read many --.

In column 7, line 16, in Claim 31, after “from” insert -- non-write once read many --.

In column 8, line 3, in Claim 35, delete “in” and insert -- of --, therefor.

In column 8, line 6, in Claim 35, insert -- non-write once read many -- before “standard”.

In column 8, line 16, in Claim 36, insert -- non-write once read many -- before “standard”.

Signed and Sealed this

Eleventh Day of August, 2009

David J. Kappos

David J. Kappos
*Director of the United States Patent and Trademark Office*